Nov. 26, 1935. T. C. BROWNE 2,022,183
METHOD OF MANUFACTURING RUBBER PRINTING PLATES
AND OTHER ARTICLES OF RUBBER
Filed Nov. 17, 1931

INVENTOR
Theodore C. Browne

Patented Nov. 26, 1935

2,022,183

UNITED STATES PATENT OFFICE 2,022,183

METHOD OF MANUFACTURING RUBBER PRINTING PLATES AND OTHER ARTICLES OF RUBBER

Theodore C. Browne, Hinsdale, Ill.

Application November 17, 1931, Serial No. 575,500

10 Claims. (Cl. 41—25)

In an application of Theodore C. Browne and Alfred C. Buttfield, Serial Number 546,456, filed June 24, 1931, a method of forming rubber printing plates and of avoiding the evil of shrinking was described. In that process, the water forming the suspending medium of a dispersion of rubber is removed by absorption into the matrix itself consequently, the impression-bearing rubber film is materially dehydrated during its formation. Previously, when chemical coagulants or electrophoresis were used to form a rubber plate, both highly concentrated latex and water (sometimes thought of as an envelope surrounding each rubber globule) were precipitated upon the matrix. Then when the final cohesion of the rubber expressed the water, or when the water was evaporated off, severe shrinkage occurred. The following makes use of the process therein set forth, but uses as an absorbing medium hydrophilic colloids the water absorption of which may be controlled by photochemical means.

The objects of the invention are to produce printing plates in rubber directly from a photographic exposure; to avoid the expense and difficulty of etching a metal plate; to prevent shrinking and distortion in any direction to the end that registration of colors is secured; to produce a printing plate which has reasonable life and which, due to the simplicity of its manufacture, may be produced cheaply; and to produce other articles of rubber demanding designs in relief upon their surfaces.

Figure 1:
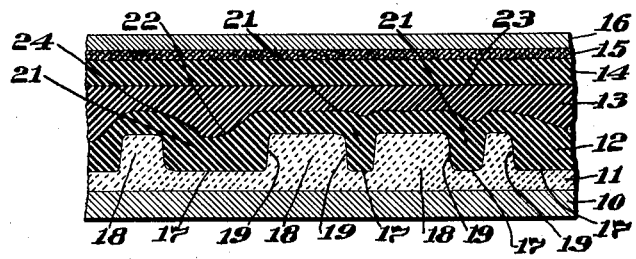
Figure 2:
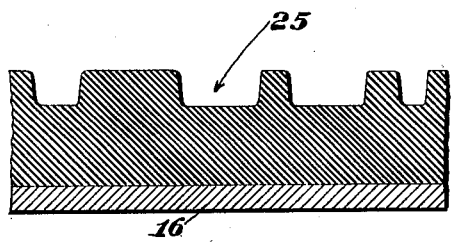
Figure 3:
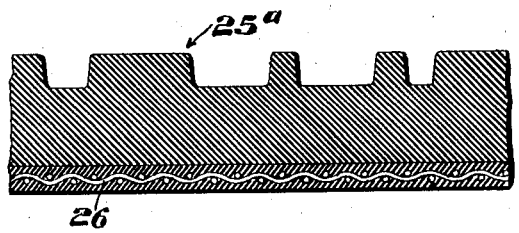
Figure 4:
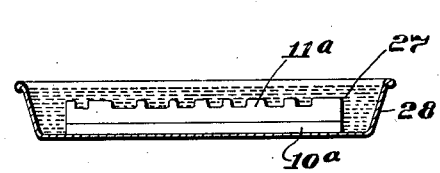
Figure 5:
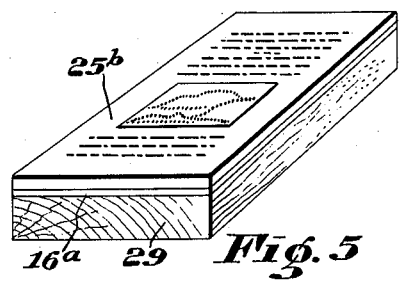
Figure 6:
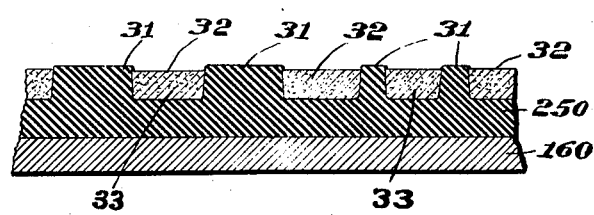

These and other objects will become apparent as the specification proceeds and the drawing is read. In the drawing, Fig. 1 represents a magnified cross section through a portion of the improved printing plate and the absorbent matrix used in its formation. Fig. 2 is a cross section through a portion of a completed plate. Fig. 3 is a cross section through an alternative form of plate. Fig. 4 illustrates the method of formation of the plate. Fig. 5 shows, in perspective, a plate as mounted upon a block for use in a printing press, and Fig. 6 is a cross-section through a plate made in accordance with this invention, but adapted for use in lithographic processes.

My invention depends upon the following facts:—It is usually believed that gelatin, in absorbing water, dissolves it and retains it own molecular structure expanded, but otherwise unchanged. Instead of expanding radially, however, it swells almost entirely in a single direction, that is along the axis on which it shrunk from the original solution. Also bichromated gelatin after exposure to light has its water absorbing properties altered to an enormous degree.

I have found that when an exposed, bichromated gelatin film, much in the nature of a collotype plate, is covered with rubber latex, it will take up water from the latex in reverse proportion to the amount of light which fell upon it and will produce a coat or film of rubber which is thick or thin in direct accord with the water absorption of the underlying gelatin. Besides this, the gelatin swells as the water is absorbed. The preservatives (such as ammonia) usually present in latex aid in the swelling, because they usually carry the gelatin past its isoelectric point.

The so-called "insolublization" of gelatin by bichromates after exposure to light is well understood and needs no discussion here. It is well to point out, however, that fully exposed bichromated gelatin will not swell and will not absorb and dissolve water to any marked extent if it be placed therein.

Thus, the sheet of gelatin which at the time of photographic printing presented a plane surface, will swell when immersed in rubber latex and present a very marked relief corresponding exactly to the exposed and non-exposed areas. The water which caused the gelatin to swell may now be found dissolved mainly in the un-exposed areas and was derived and extracted from the rubber latex.

By withdrawing water from the dispersion, an exceedingly concentrated film of latex appears against the surface of the gelatin. Soon, this film gels into a solid mass. When the solid film is examined, it will be found to be thick where the water absorption of the underlying gelatin layer was high and thin where it was low.

The word latex is used herein to denote dispersions of substances of which rubber is the type, gutta-percha, balata, etc. It denotes artificial dispersions as well as natural substances, and it is to be noted that the rubber in such dispersions may be vulcanized or in its natural state.

In carrying out my invention, I coat sheets of metal or glass with a gelatin solution containing a bichromate. No description of the material or the coating process is necessary, for such gelatin plates have long been known. I may also cement "engraver's tissue", which is paper having a smooth coat of gelatin on its face, to a metal plate. The tissue is sensitized by a short dip in bichromate solution and dried in the dark. When the gelatin or tissue is quite dry, it is put in a printing frame under a photographic negative and exposed to actinic light. To retain the sharpest definition, the usual precautions of absolute contact and collimated light are recommended.

When the exposure is complete, the gelatin plate is thoroughly washed to remove the bichromate from the unexposed areas and is then partially dried. It is then immersed in latex. For example, the plate may be laid face-up in a tray and latex poured over it. I consider it advantageous to have the gelatin plate partially dry only at this time. It is possible to work with a dry plate, but the instant appearance of a rubber film on dry gelatin may cause striations, roughness, or air bubbles. When the plate is wet, the film begins to form more slowly and gives time for the even distribution of latex over the entire surface.

I find it usually more convenient to pour out a measured quantity of latex and allow this to dry thoroughly, but also superfluous latex may be poured off after a definite time leaving a film of gelatinized rubber against the gelatin surface. The term "gelatinized" as used herein to describe the product produced by this process is intended to distinguish from the term "coagulated" or "truly coagulated". Gelatinized latex, as the term is used herein, when examined under a microscope presents the appearance of agglomerated masses of globular particles adhering together. Coagulated latex, similarly examined, presents the appearance of a somewhat interlaced mass of twigs.

In Fig. 1, a greatly enlarged section through an uncompleted half-tone plate made by my process, 10 indicates the metal or glass plate on which the gelatin 11 originally was spread. The parts, 17, 17, of the plate were exposed to light and consequently, do not swell, but the parts 18, 18, lay in areas protected by the silver grains in the negative and are unexposed. They are shown as having absorbed water from the latex and as swelled. Extra absorbing surfaces, i. e. 19, 19, are brought into being by this swelling. Water absorption through these surfaces into the parts 18, 18 is important in the formation of the rubber protuberances 21, 21, which extend into the gelatin mass. As illustrated, the upper surface 22, of gelatinized latex 12, bears a relief having a blunted or eroded appearance. In fine-screen half tones, this effect may be neglected. In coarser work, it may be necessary to even out the surface by pouring over the dried latex a second coat, 13, of the same material. When this dries, it usually presents a smooth upper surface, 23, but when large type is to be reproduced it may be necessary to paint such low areas as 24 with alcohol or some other coagulating agent for latex. The extra precipitation caused by the coagulant, then will level the upper surface 23.

I prepare a backing comprising a metal plate 16 (for certain purposes this may be a wire screen) covered with "veneer" 15. This may be gutta-percha, an essentially gutta-percha bonding-to-metal compound, or even a highly acidulated cement. Its only function is to cause the sheet 14, a calendered semi-cured sheet of milled rubber, to stick to the metal plate 16.

When the coat 13, of latex is dry, this prepared backing is pressed down firmly upon the upper surface 23 of the part 13. The entire assembly as shown in Fig. 1, is now removed to a fume chest and cured in sulphur chloride vapor. If, however, vulcanized latices are used, no cure is necessary. In that case, the parts 14 and 13 are cemented together and the rubber sheet 14 is given a full cure usually in conjunction with the cure of the veneer 15.

After the cure, the rubber and gelatin usually come apart without difficulty. The gelatin is washed and may be used to form a few more rubber plates. It may also be dissolved off the face of the rubber by hot water.

Figures 2, 3, 4, and 5 are largely self-explanatory. In Fig. 2, a section through a completed plate with the gelatin removed, the various layers of latex and milled sheet, now consolidated into a single unit 25 are shown rigidly held to the metal back, 16. The section through the plate when a wire screen 26, is substituted for the metal plate 16, is shown in Fig. 3. Fig. 4 shows the plate in the tray during its formation. The tray 28 is shown broken away and the liquid latex 27 is seen covering the gelatin 11a on its support 10a.

A plate suitable for lithography is shown in Fig. 6. The upper (and first) latex film 25a bears raised portions 31, 31, thereon. In fact, the plate so far is identical to those just described. The low portions 33, 33, are, however, filled with a hydrophilic colloid 32, 32, preferably gum-arabic bichromated and exposed to light.

The plate is made by laying a rubber plate face-down on a very flat surface which bears a well worked out coat of lithographic ink. Thus the high spots 31, are coated with a water repellant substance. The plate is then gummed in the usual manner. When cleaned, the original rubber surface is exposed at points 31, 31. It differs from an ordinary lithographic plate in that two distinct substances make up the working area, rubber in the areas 31, which receives ink and water receptive gum 32, 32, which repels it. With such plates, simple duplicating or multigraphing machines may be easily adapted to give good lithographic results.

If a type-high plate is wanted, the plate assembly may be mounted upon a block 29, as shown in Fig. 5. The plate assembly alone may be used on patent base material if care is taken to hold the rubber 25b, to definite thickness and the steel plate 16a, is made thick enough to prevent its bending when the clamps are set up.

Although I have used the words photographic negative, I desire to point out that the nature of the light stencil through which the gelatin is exposed has no effect upon the process itself. The photographic desiderata are only those met in good photo-engraving practice. It is obvious that if the whites are not clear, or the exposure not uniform across the surface, a flat plate cannot be produced, for under-exposed areas due to muddiness or poor lighting will swell and so produce a low spot.

Either raised surface or intaglio plates may be made by the process. Photographic positives produce intaglio results.

According to the statutory requirement, I have set forth a preferred embodiment of my invention, and a preferred process for its manufacture. It is understood, however, that the usefulness of this invention is by no means confined to the manufacture of printing plates, but that other articles, such as artificial leather, which must bear a grain or relief upon their surface may be made by this means. Gelatin, also has been used throughout to indicate a type substance possessing the property of swelling and a controllable water absorption in certain areas is indicated thereby. Such substances can be substituted for gelatin itself.

An alternative method of making the plates is as follows:—The gelatin plate is made and exposed as has previously been described. After exposure, it is washed and simultaneously swelled. The swelling may be enhanced by a proper concentration of acid or alkali in the water. The completely swelled gelatin plate is placed in a tray and a solution of rubber poured over it. When the solvents in the rubber have evaporated a film of rubber bearing in relief the type matter or design will be found covering the gelatin. Drying must be carefully carried out. Forced or hurried evaporation will cause pulling and shrinkage. Although I prefer the use of rubber dispersions, since difficulty with shrinkage is almost completely overcome, nevertheless, benzol, etc., solutions of rubber when dried over swelled gelatin as above described produce practicable, usable plates.

What I claim therefore is:—

1. The process of producing printing plates which includes making a mixture of bichromate and gelatin, forming a sheet from the mixture, exposing the sheet to light through a light-controlling screen, and placing the exposed sheet in an aqueous dispersion of rubber, thereby producing a relief-bearing rubber film against the surface of the sheet.

2. The process of manufacturing printing plates which comprises preparing a sheet of material capable of absorbing water, causing the material to have a non-uniform water absorptive capacity, placing the material in rubber latex, whereby a coat of rubber is built up upon the surface of the material, reinforcing the rubber coat, and curing the rubber.

3. In a process for forming articles of rubber, the step which comprises gelatinizing a layer of rubber from a dispersion thereof against a surface already rendered differentially water absorptive by photo-chemical action.

4. The process of forming articles of rubber which comprises the steps of rendering a surface differentially absorptive by photo-chemical action, causing the absorptive parts of said surface to absorb a liquid, and thereby to swell differentially, covering the differentially swelled surface with a dispersion of rubber, and gelatinizing the rubber in the dispersion adjacent the surface into a continuous film.

5. The process of forming articles of rubber which comprises the steps of rendering a surface differentially absorptive by photo-chemical action, causing the absorptive parts of said surface to absorb a liquid and thereby to swell differentially, covering the differentially swelled surface with a solution of rubber, allowing the solvent to evaporate, and thereby forming against the surface a relief-bearing rubber film.

6. The process of manufacturing printing plates comprising preparing a sheet of photosensitive hydrophilic material, changing the water absorbing property of said sheet, causing said sheet to swell differentially, gelatinizing a coat of rubber latex upon the surface of the differentially swelled sheet, and backing the rubber coat to provide mechanical support.

7. The process of producing a printing plate which includes forming a sheet of gelatine and a bichromate, reducing certain portions of the bichromate in the plate, covering the plate with a water dispersion of rubber, dehydrating the dispersion by causing the gelatine to absorb the water therefrom, drying the gelatinized rubber film, curing the film and affixing the film to a suitable support.

8. In a process for forming from rubber, articles having a predetermined surface configuration, the step which includes the dehydration of a water dispersion of rubber by causing the water therein to be absorbed through a surface having a non-uniform water absorptive capacity arranged according to said predetermined configuration.

9. In a process for forming from rubber, articles having a desired surface configuration, the step which includes the dehydration of a rubber dispersion by causing the water therein to be absorbed through a surface having a non-uniform water absorptive capacity arranged according to said desired configuration, and the step of subsequent drying of the rubber film so formed while the film is still in contact with said surface.

10. A printing plate comprising a printing surface of solidified vulcanized latex characterized in appearance under microscopic examination after solidification of agglomerated globular masses, a backing layer of rubber, and a supporting plate.

THEODORE C. BROWNE.